United States Patent
Haney et al.

[11] Patent Number: 5,920,035
[45] Date of Patent: Jul. 6, 1999

[54] HIGH PRESSURE SEAL

[75] Inventors: Harold E. Haney; Rudy Heistad, both of Winnipeg; Stan Chuchmuch, Selkirk, all of Canada

[73] Assignee: ATP International Ltd., Providence House, Bahamas

[21] Appl. No.: 08/815,539

[22] Filed: Mar. 12, 1997

[51] Int. Cl.[6] ...................................................... H02G 3/18
[52] U.S. Cl. ................................ 174/65 SS; 174/152 G; 174/153 G; 174/65 G
[58] Field of Search ............................... 174/65 SS, 65 G, 174/151, 135, 152 G, 153 G; 248/56; 16/2.1, 2.2

[56] References Cited

U.S. PATENT DOCUMENTS

| | | | |
|---|---|---|---|
| 2,170,393 | 8/1939 | Tornblom | 174/65 SS X |
| 2,717,792 | 9/1955 | Pelley | 174/152 G X |
| 2,936,187 | 5/1960 | Peterson | 174/65 SS X |
| 2,963,536 | 12/1960 | Kokalas | 174/65 SS X |
| 3,142,500 | 7/1964 | Wesseler | 174/151 X |
| 4,267,401 | 5/1981 | Wilkinson | 174/151 X |
| 4,375,011 | 2/1983 | Grünau | 174/65 SS |
| 4,386,817 | 6/1983 | Benker et al. | 174/65 G X |
| 4,438,292 | 3/1984 | Woodall | 174/65 SS X |
| 4,738,636 | 4/1988 | Bolante | 174/65 SS X |
| 4,965,409 | 10/1990 | Lindroos | 174/65 SS |

FOREIGN PATENT DOCUMENTS

| | | | |
|---|---|---|---|
| 24441 | of 1914 | United Kingdom | 174/152 G X |

*Primary Examiner*—Dean A. Reichard
*Attorney, Agent, or Firm*—Adrian D. Battison; Murray E. Thrift

[57] ABSTRACT

The high pressure seal is for use with submersible electric pumps employed in water treatment apparatus and with any other electrical device used under similar conditions. The high pressure seal provides a device for closing an opening in a wall of a housing containing high pressure water and for sealing around wires extending through the opening. The high pressure seal includes a hollow fitting for engaging within the opening in the housing, an insert having a number of bores extending through the insert for receiving the wires, and seal enhancing means including raised protrusions arranged internal to and annularly around each bore for sealing around the wires. The high pressure seal may alternatively include a solid fitting for engaging within the opening in the housing, a number of bores extending through the fitting for receiving the wires, and a ring shaped insert arranged in an annular groove arranged around each bore for sealing around the wires.

7 Claims, 5 Drawing Sheets

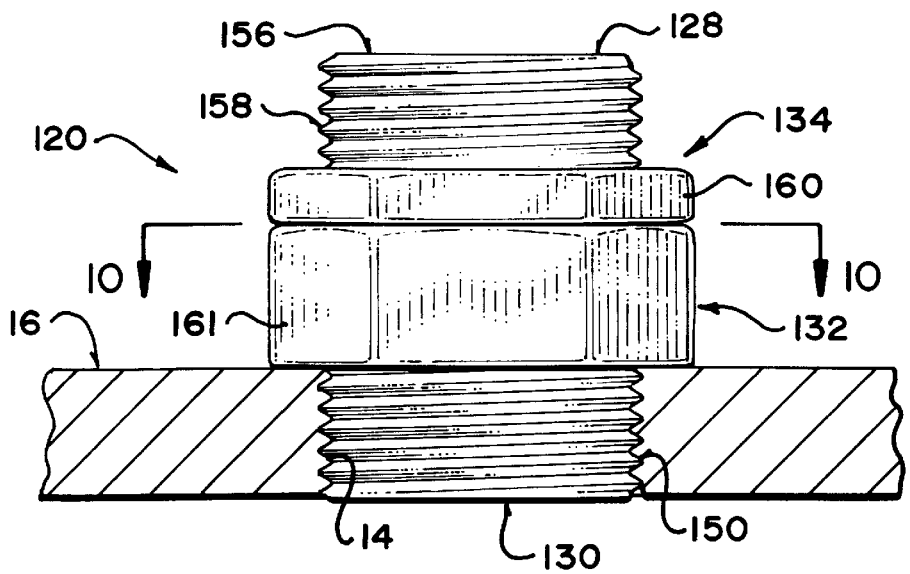
FIG. 7
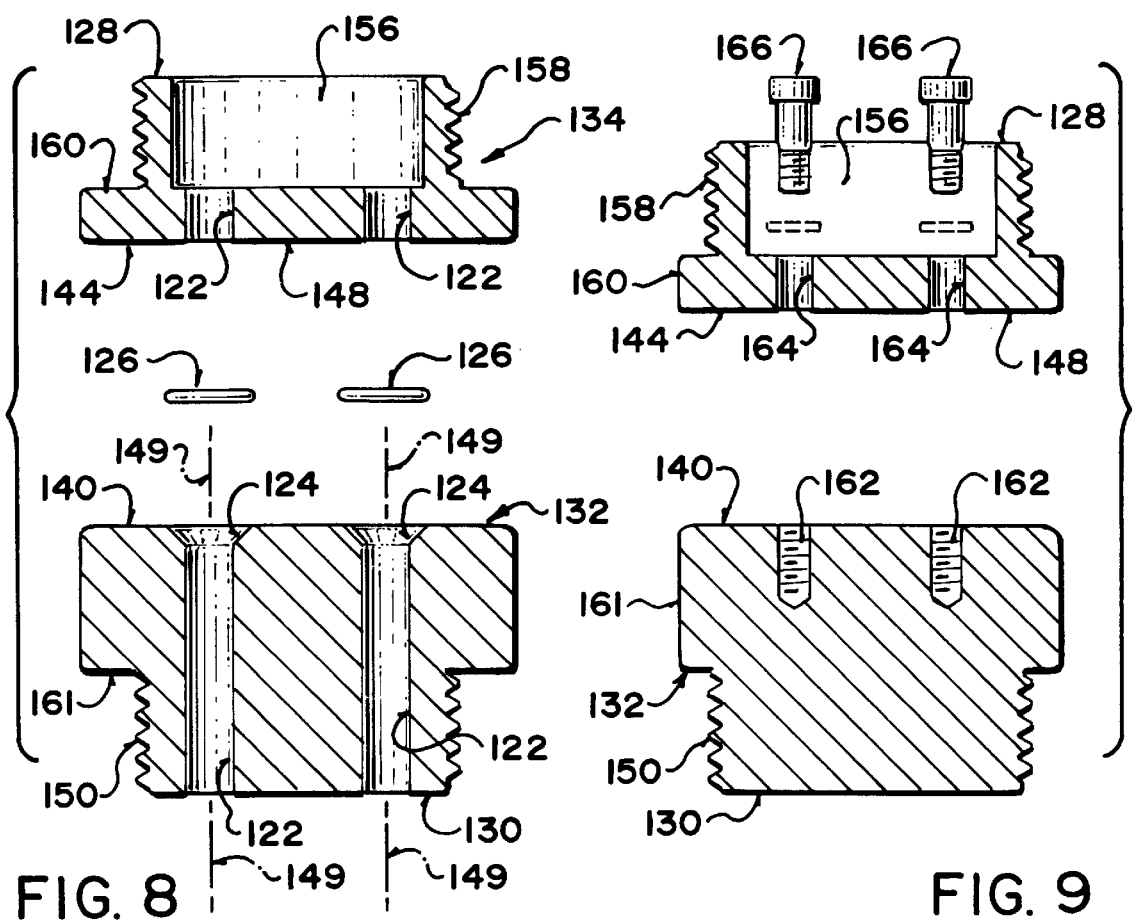
FIG. 8
FIG. 9

HIGH PRESSURE SEAL

FIELD OF THE INVENTION

The present invention relates to high pressure seals for sealing around a wire or wires extending through an opening in a wall, particularly of the type for use with submersible pumps and other submersible electric devices.

BACKGROUND

Providing a seal around electrical wires that communicate electrical power to submerged electric devices is a problem in many applications. This is particularly a problem when the electrical wires extend through the wall of a container or housing containing pressurized water.

One example of a device in which this problem can occur is a water treatment apparatus utilizing membrane separation technology. In this type of device high pressure submerged pumps are used to pressurize and circulate water to membrane separators at pressures up to, and in some cases above, 1800 psi. The pumps are usually arranged within a housing which surrounds the pumps and contains the water which passes around and through the pumps. Electrical power is provided to the pumps through an opening in the housing by an electrical wire and therefore a seal is need to prevent high pressure water from escaping the housing.

Seals are commercially available for use in this and similar applications. These seals usually comprise a fitting for engaging a hole in the housing and an plug having one or more bores extending through it. The plug is arranged around the wire engaging the wire to provide a seal. This type of seal has been found to provide a poor seal at pressures above 100 psi and is not suitable for extended use at pressures of greater than 100 psi.

This problem also occurs with seals used with other types of electrical devices employed in applications under similar conditions, some examples of which are submerged heaters and sensing equipment.

SUMMARY

According to the present invention there is provided an apparatus for treating water from a water supply comprising:

a submersible electric device having at least one wire for communication of electrical power thereto;

a housing surrounding the electric device, said housing having an outer wall and an opening through the outer wall;

a fitting for engaging within the opening in the housing closing the opening, said fitting comprising a fitting body having a first end arranged external to the housing, a second end arranged to removablely and reengagably engage within the opening in the housing, and at least one bore extending through the fitting body from the first end to the second end thereof, said at least one bore having a surrounding surface and a longitudinal centre line extending therethrough and being arranged to receive the at least one wire therethrough;

and sealing means arranged within each of the at least one bore, said sealing means comprising a raised protrusion of deformable resilient material arranged annularly around each bore and extending radially into the bore from the surrounding surface towards the longitudinal centre line of the bore engaging the at least one wire arranged therein, thereby sealing around the at least one wire.

Preferably the fitting includes compression means for compressing the raised protrusion such that the protrusion is forced radially inwards towards the longitudinal centre line of the bore thereby tightening the seal around the at least one wire.

Preferably the sealing means comprise an insert of deformable resilient material having an first end, and a second end, and being arranged within a tapered hollow in the fitting body. Each bore extends through the insert from the first end to the second end. The compression means include means for slidably moving the insert within the first portion of the fitting body along the taper such that the insert is compressed inwards towards the longitudinal centre line of the first portion by the internal wall thereby tightening the seal around the at least one wire.

Alternatively the sealing means comprise an annular groove arranged around each of the at least one bore at the first end of the first portion widening said bore, and a substantially ring shaped insert of deformable resilient material arranged within the groove. One example of an acceptable ring shaped insert is an O-ring. The insert is arranged within each annular groove and extends into the at least one bore engaging the at least one wire, thereby sealing around the at least one wire. The insert is seated partially within the groove having a portion projecting out of the groove in a direction away from the first portion of the fitting body and has an outer diameter slightly larger than the first inner diameter of the groove. The annular groove may include a taper narrowing in a direction from the first end of the fitting body to the second end of the fitting body. The compression means force the insert into the groove such that the insert is compressed inwards towards the longitudinal centre line of the first portion by the internal wall thereby tightening the seal around the at least one wire.

BRIEF DESCRIPTION OF THE DRAWINGS

In the accompanying drawings, which illustrate an exemplary embodiment of the present invention:

FIG. 7 is a front view of a first alternative embodiment of the high pressure seal.

FIG. 8 is a cross-sectional view of the first alternative embodiment of the high pressure seal through D—D of FIG. 10.

FIG. 9 is a cross-sectional view of the first alternative embodiment of the high pressure seal through F—F of FIG. 11.

DETAILED DESCRIPTION

Figure 1:
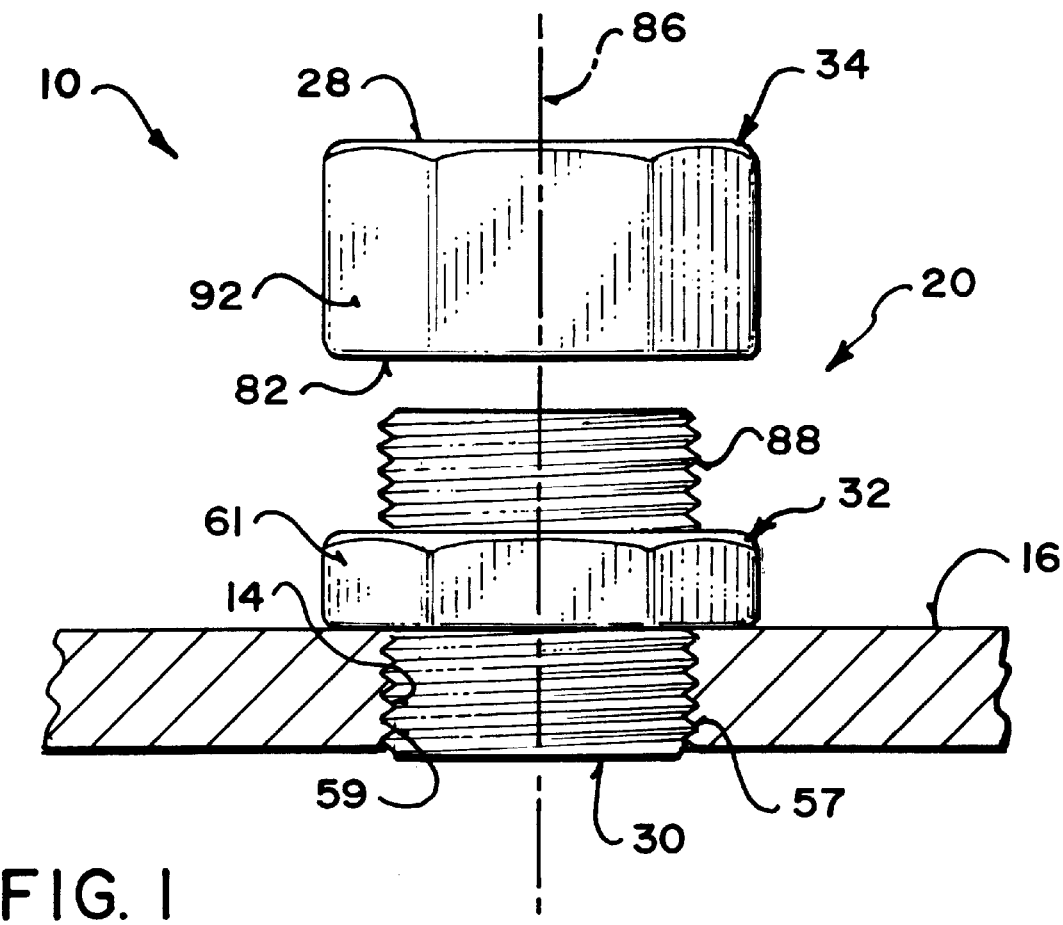
FIG. 1 is a front view of the high pressure seal.
Figure 3:
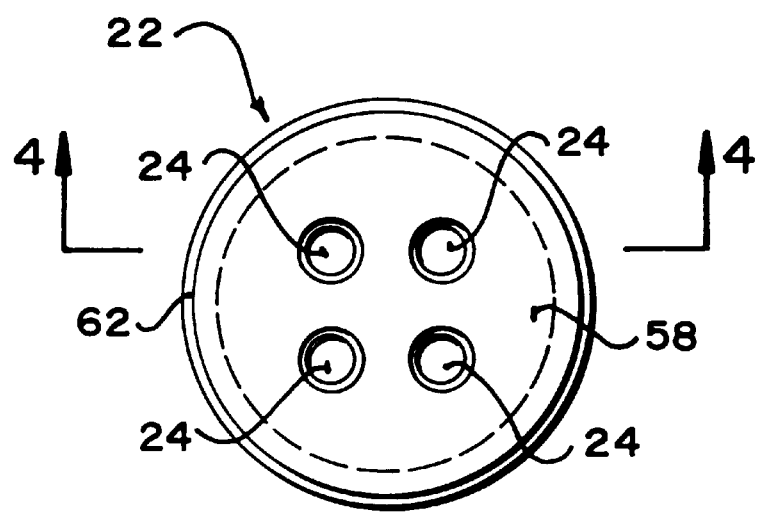
FIG. 3 is a top view of the insert.
Figure 2:
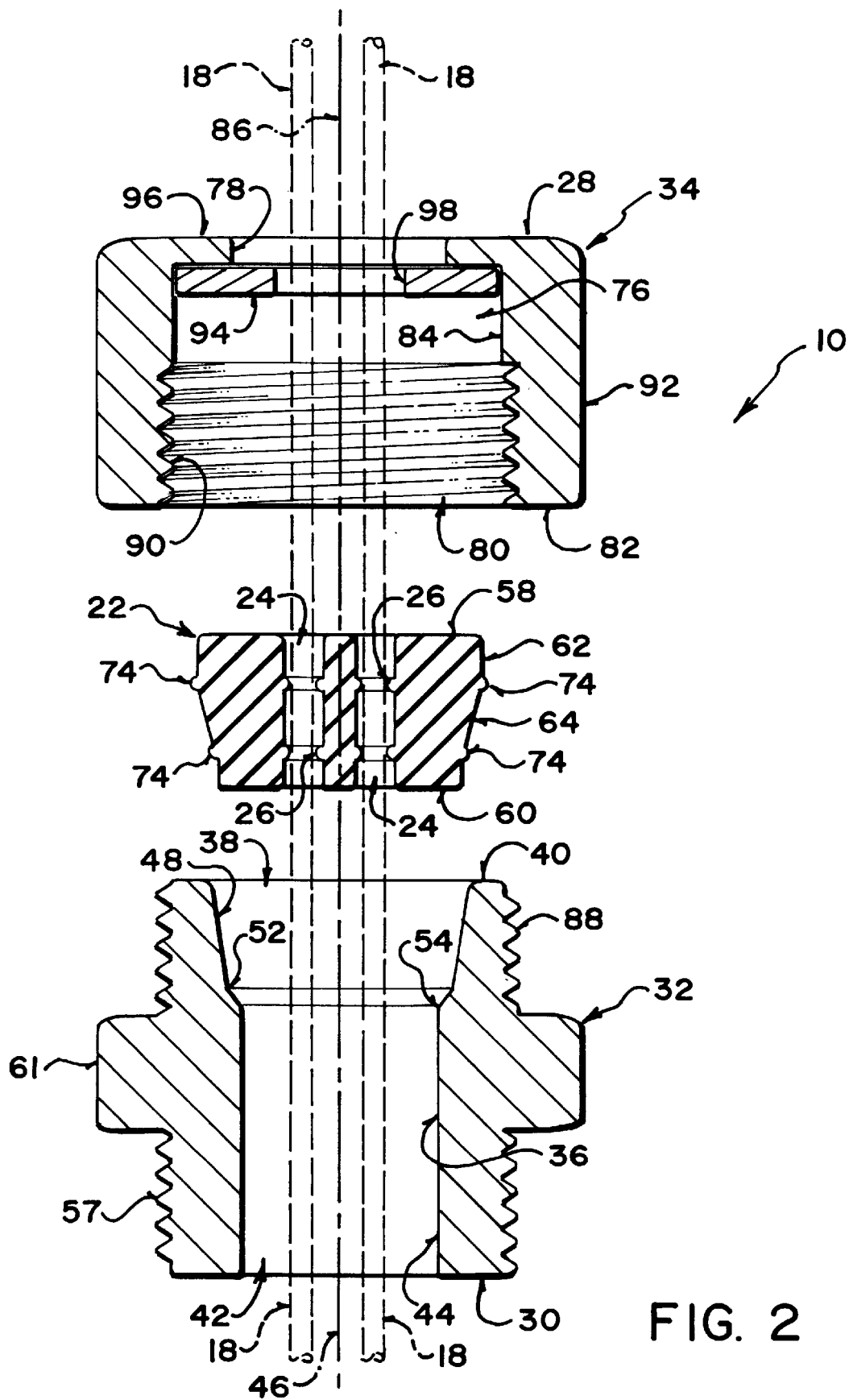
FIG. 2 is a cross-sectional front view of the high pressure seal.
Figure 6:
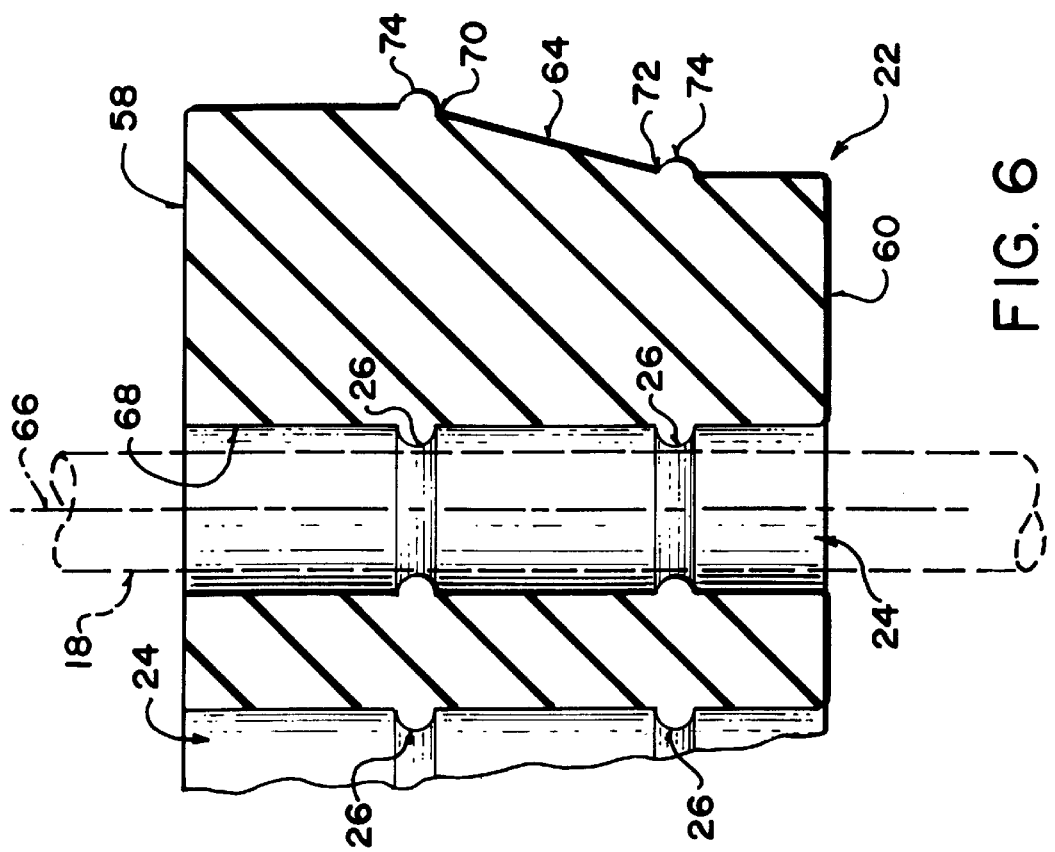
FIG. 6 is an enlarged cross sectional view of the insert showing the raised projections.
Figure 4:
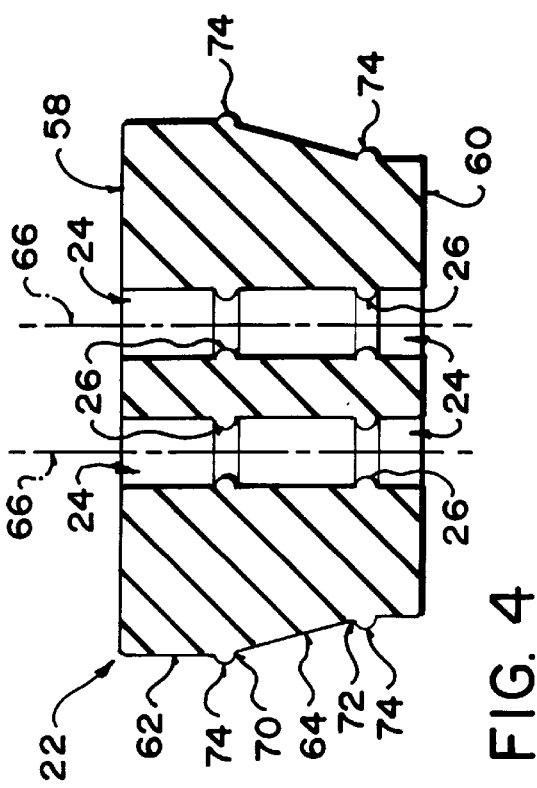
FIG. 4 is a cross sectional view of the insert through A—A of FIG. 3.
Figure 5:
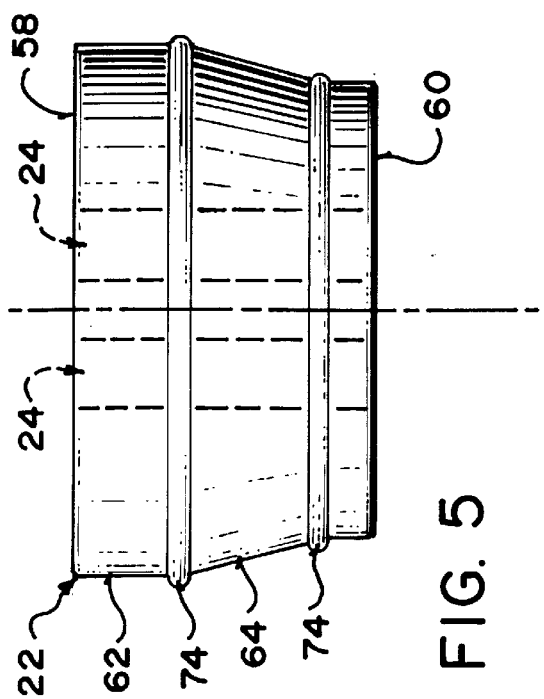
FIG. 5 is a side view of the insert.
Figure 10:
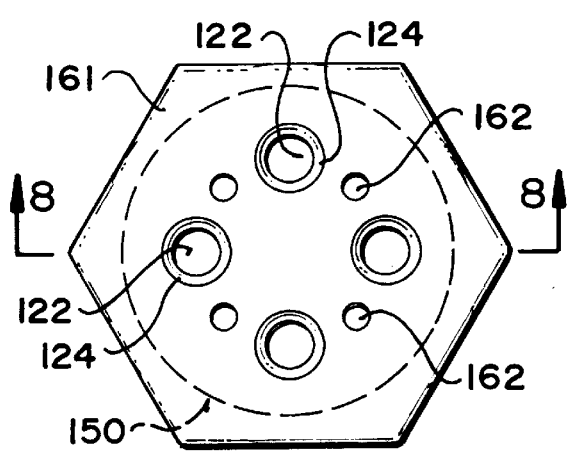
FIG. 10 is a top view of the first portion of the fitting body of through A—A of FIG. 7.
Figure 11:
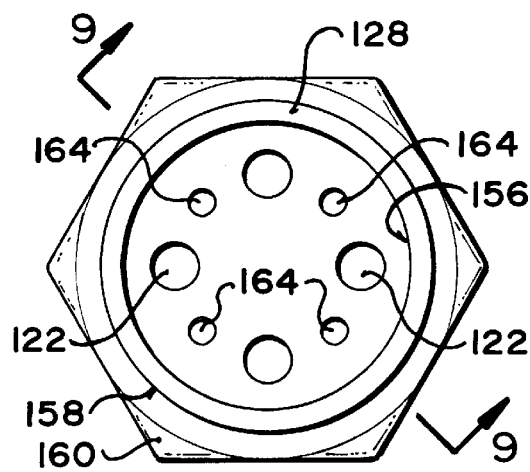
FIG. 11 is a top view of the second portion of the fitting body.
Figure 12:
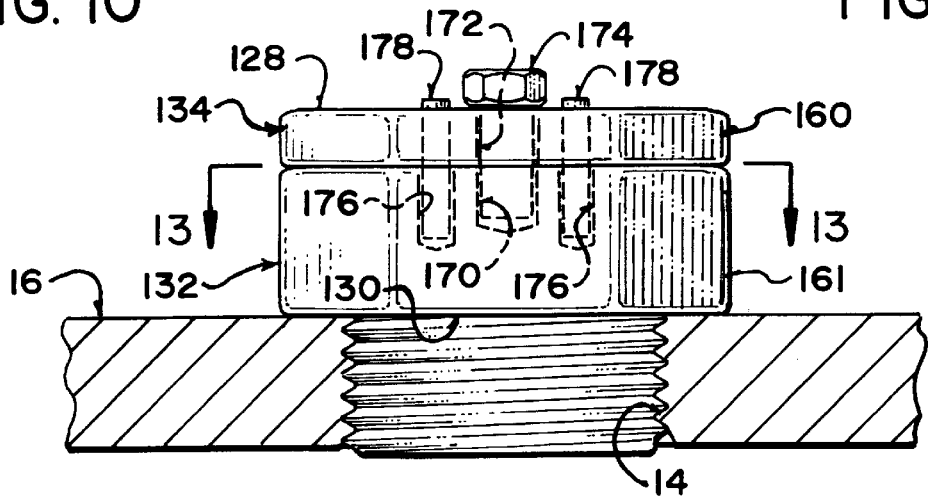
FIG. 12 is a front view of a second alternative embodiment of the high pressure seal.
Figure 13:
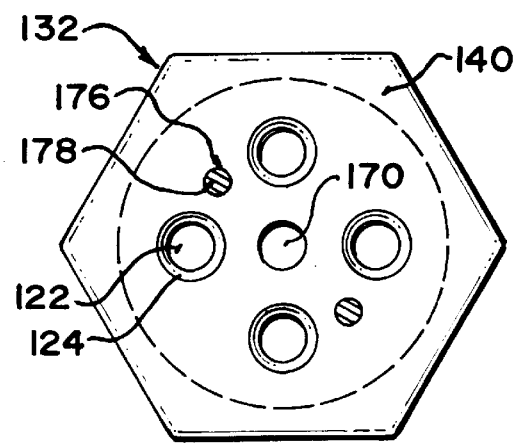
FIG. 13 is a top view of the first portion of the fitting body of the second alternative embodiment of the high pressure seal through A—A of FIG. 12.
Figure 14:
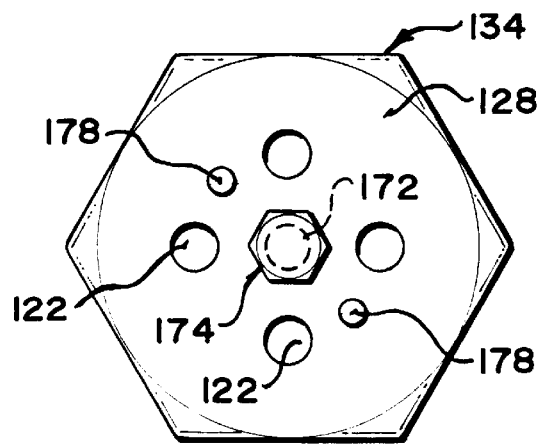
FIG. 14 is a top view of the second portion of the fitting body of the second alternative embodiment of the high pressure seal.

Referring to FIGS. 1, 2, and 3 the high pressure seal is shown generally at 10. The high pressure seal 10 may be used with submersible electric pumps employed in water treatment apparatus and with any other electrical device used under similar conditions. High pressure submersible pumps are used in water treatment apparatus to pressurize and circulate water through the apparatus at pressures up to, and in some cases above, 1800 psi. These pumps are usually arranged within a housing which surrounds the pump and contains pressurized water which passes around and through the pump. Electrical power is provided to the pump through an opening 14 in a wall 16 of the housing by one or more electrical wires 18. In the embodiment illustrated four wires 18 are employed. The high pressure seal 10 closes the opening 14 in the wall of the housing and provides a seal around each of the wires 18.

The high pressure seal 10 comprises a fitting 20 for engaging within the opening 14 in the housing, an insert 22 having four bores 24 extending through the insert 22 for receiving the wire 18, and seal enhancing means 26 comprising a pair of raised protrusions arranged internal to and annularly around each bore 24.

The fitting 20 engages within the opening 14 in the wall 16 closing the opening 14. The fitting 20 has a first end 28 arranged external to the wall 16 of the housing, and a second end 30 opposite the first end 28 and arranged at the opening 14 in the housing. The fitting 20 comprises a two part body, having a first portion 32 and a second portion 34, and is usually made of aluminum, steel, brass, or other appropriate metal.

The first portion 32 of the fitting body is hollow and substantially cylindrical in shape. The first portion 32 extends between a first end 40 which is arranged to engage the second portion 34, and a second end which is provided by the second end 30 of the fitting 20. A channel 36 forms the hollow portion and extends longitudinally through the first portion 32 from the first end 40 to the second end 30. An opening 38 aligned with the channel 36 is arranged at the first end 40 and an opening 42 also aligned with the channel 36 is arranged at the second end 30. The insert 22 is received within the channel 36 of the first portion 32 through the opening 38 at the first end 40.

The channel 36 is defined by an internal wall 44 and includes a tapered section 48 adjacent the first end 40 of the first portion 32. The tapered section 48 narrows in a direction from the first end 40 towards the second end 30, and tapers from a first inner diameter at the first end 40 inwards towards a longitudinal centre line 46 extending through the channel 36. The tapered section 48 tapers with a first slope from the first end 40 to a transition point 52. At the transition point 52 the channel 36 tapers more sharply inwards with a second slope to an end 54 of the tapered section 48. The end 54 of the tapered section 48 is located at a position spaced from the second end 30 of the first portion 32. At the end 54 of the tapered section 48 the channel 36 has a second inner diameter which is smaller than the first inner diameter. The channel 36 then continues through the first portion to the second end 30 with a diameter equal to the second inner diameter.

The first portion 32 of the fitting 20 also includes an external thread 57 arranged adjacent the second end 30 for cooperation with an internal thread 59 in the opening 14. This permits a secure connection to be made between fitting 20 and the housing wall 14. The first portion 32 of the fitting 20 also includes an external portion 61 which is hexagonal in cross section and arranged for cooperation with a wrench, or other turning means, to allow the first portion 32 of the fitting 20 to be rotatably engaged with, and tightened into the internal thread 59 in the opening 14.

Referring to FIGS. 2 to 6 the insert 22 comprises a plug member made of deformable resilient material. The insert 22 is substantially circular in cross section, and has a first end 58, and second end 60. The insert 22 is sized and arranged to engage within the channel 36 of the first portion 32 such that the first end 58 of the insert 22 lies adjacent the first end 40 of the first portion 32.

The insert 22 has an exterior wall 62 which includes a tapered portion 64 extending longitudinally along the insert 22 in a direction from the first end 58 of the insert 22 towards the second end 60 of the insert 22. The tapered portion 64 narrows from a first exterior diameter at a starting point 70 which is spaced from the first end 58 of the insert 22 to a second exterior diameter at an end point 72 spaced from the second end 60 of the insert 22. The first exterior diameter of the insert 22 is larger than the first inner diameter of the channel 36 of the first portion 32 of the fitting 20, and the second exterior diameter of the insert 22 is larger than the second inner diameter of the channel 36, and the tapered portion 64 of the insert 22 is sloped at substantially the same angle as the first slope of the tapered section 48 of the channel 36, such that when the insert 22 is in place within the first portion 32 it is compressed inwards by the inner walls 44 of the channel 36.

Four bores 24 extend longitudinally through the insert 22 from the first end 58 to the second end 60. Each of the four bores 24 has a surrounding surface 68 interior to the insert 22 which defines the bore 24. A longitudinal centre line 66 extends longitudinally through each bore 24. Each of the bores 24 is arranged to receive a wire 18.

The taper 48 of the first portion 32 of the fitting 20 and the external wall 62 of the insert 22 are sized and arranged such that moving the insert 22 into place within the channel 36 of the first portion 32 and along the taper 48 towards the second end 30 causes the internal wall 44 to compress the insert 22 inwards towards the longitudinal centre line 46 of the channel 36. This forces the surrounding surface 68 of each bore 24 into each wire 18 tightening the insert 22 around each wire 18.

The seal enhancing means 26 are arranged within each bore 24, and comprise a raised protrusion of deformable resilient material arranged annularly around the bore 24. Each raised protrusion 26 extends radially into the bore 24 from the surrounding surface 68 towards the longitudinal centre line 66 of the bore 24. Each raised protrusion 26 engages the wire 18 arranged within the bore 24 improving the seal around the wire 18.

Two raised protrusions 26 are arranged in and spaced longitudinally along each bore 24 through the insert 22. The raised protrusions 26 are arranged within each bore 24 between the starting point 70 and the end point 72 of the external tapered portion 64 of the external wall 62 of the insert 22. The raised protrusions 26 in each of the bores 24 are aligned radially with corresponding raised protrusions 26 in each of the other bores 24.

The insert 22 also includes two exterior raised protrusions 74 arranged annularly around the exterior wall 62 of the insert 22 and extending radially outwards from the exterior wall 62. Each exterior protrusion 74 engages the internal wall 44 of the first portion 32 of the fitting 20, and is arranged to align radially with one of the raised protrusions 26 in each of the bores 24. The external protrusions 74 help compress the insert 22 at positions in line with the raised protrusions 26 in the bores 24 to further force the raised protrusions 26 inwards thereby further improving the seal around the wires 18.

The second portion 34 of the fitting body is hollow and substantially cylindrical in shape, and has a first end 28 and a second end 82. The first end of the second portion 34 is provided by the first end 28 of the fitting 20. The second end 82 lies at an end opposite the first end 28 and is arranged to engage the first portion 32 of the fitting 20. A channel 76 extends longitudinally through the second portion 34 from the first end 28 to the second end 82. The second portion 34 has an opening 78 aligned with the channel 76 at the first end 28 and an opening 80 aligned with the channel 76 at the second end 82. The channel 76 is defined by an internal wall 84 and has an inner diameter sized to engage around an outer diameter of the first end 40 of the first portion 32. A longitudinal centre line 86 extends through the channel 76.

The second end 82 of the second portion 34 includes screw threads at the second end 82 to allow for removable and reengagable connection of the second portion 34 to the first end 40 of the first portion 32. The screw threads comprise an external thread 88 arranged on the first end 40 of the first portion 32 and an internal thread 90 arranged within the channel 76 of the second portion 34. The screw threads allow for movement of the second portion 34 over the first portion 32 towards the second end 30 of the first portion 32 when positioning the insert 22 within the channel 36.

The second portion 34 of the fitting 20 also includes an external portion 92 which is hexagonal in cross section and arranged for cooperation with a wrench, or other turning means, to allow the second portion 34 of the fitting 20 to be rotatably engaged with, and tightened onto, the external threads 88 of the first portion 32.

A compression plate 94 is arranged within the channel 76 in the second portion 34 and is retained by a annular projection 96 at the first end 28 of the second portion 34. An opening 98 extends through the compression plate 94. The opening 98 is aligned with the opening 78 in the first end 28 of the second portion 34 to allow the wires 18 to pass through the second portion 34. The compression plate 94 is held within the second portion 32 by the annular projections 96 such that as the second portion 32 is threaded onto the first portion 32 compression plate 94 engages the first end 58 of the insert 22 slidably moving the insert 22 axially within the taper 48 compressing the insert 22. The insert 22 is compressed inwards towards the longitudinal centre line 46 of the first portion 32 by the internal wall 44 as it is forced along the taper 48 thereby closing each bore 24 around a corresponding wire 18 and forcing the raised protrusion into the wire 18 thereby sealing around the wire 18.

In an alternative embodiment the insert 22 may include any appropriate number of internal and external protrusions 26 and 74.

Referring to FIGS. 7 to 11 another alternative embodiment of the high pressure seal 10 comprises a fitting 120 for engaging within the opening 14 in the wall 16 of the housing. The fitting 120 comprises a two part body, having a first portion 132, a second portion 134, and is usually made of aluminum, steel, brass, or other metal.

The fitting 120 has a first end 128 arranged external to the wall 16 of the housing, and a second end 130 arranged at the opening 14 in the housing. Four bores 122 extend through the fitting 120 from the first end 128 to the second end 130. Each bore 122 is of a diameter selected to provide a snug sliding fit for the wire 18 which is to be positioned in the bore 122.

The first portion 132 of the fitting body is substantially cylindrical in shape and is solid, lacking the channel 36 of the embodiment described above. The first portion 132 has a first end 140, and a second end 130. The four bores 122 extend through the first portion 132 from the first end 140 to the second end 130. The first portion 132 includes an exterior portion 161 which is hexagonal in cross section and is arranged for cooperation with a wrench, or other turning means, to allow the first portion 132 of the fitting 120 to be rotatably engaged with, and tightened via its external threads 150, into the opening 14.

Each annular groove 124 is arranged at a first end 140 of the first portion 132 and has a first inner diameter at the first end 140 larger than the diameter of the bore 122. Each groove 124 tapers inwards narrowing in a direction from the first end 140 towards the second end 130 of the first portion 132 to a second inner diameter spaced from the first end 140 equal to the diameter of the bore 122.

Each ring shaped insert 126 is made of deformable resilient material and has an outer diameter slightly larger than the first inner diameter of the groove 124. An O-ring may be used as the insert although other appropriate inserts may also be used. Each insert 126 is sized and arranged to lie within a respective annular groove 124 such that it extends radially into the bore 122 providing a protrusion arranged internal to and annularly around each bore 122. The insert engages the wire 18 sealing around the wire 18. The insert 126 is seated within the groove 124, so that it lies partially within the groove 124, projecting out of the groove in a direction away from the first end 140 of the first portion 132 and towards a second end of the second portion 134.

The second portion 134 of the fitting 120 includes a first end 128, and a second end 144. The second end 144 is arranged adjacent the first end 140 of the first portion 132. Each of the bores 122 extends through the second portion 134 from the first end 128 of the second portion 134 to the second end 144 of the second portion 134.

The first end 128 of the second portion 144 includes a cylindrical connection member 156. The cylindrical connection member 156 is a wall arranged on the first end 128 around the bores 122 such that the wall encloses the bores 122 radially. An external thread 158 is arranged on the connection member 156 for cooperation with an internal thread on an electrical conduit (not shown) thereby surrounding and enclosing the wires 18. The second portion 134 includes an exterior portion 160 which is hexagonal in cross section and is arranged at the second end 144 to align with the hexagonal portion 161 on the first member 132. The hexagonal portions 160 and 161 provide a surface to engage the turning means.

The second end 144 of the second portion 134 includes a contact face 148 arranged to engage the portion of each insert 126 which projects out of the groove 124 for forcing the insert 126 into the groove 124. The contact surface 148 forces the insert 126 compressing the insert 126.

The fitting 120 includes removable and reengagable connection means for connecting the second end 144 of the second portion 134 to the first end 140 of the first portion 132, and for moving the second portion 134 in a direction towards the second end 130 of the first portion 132 and into contact with the first portion 132. Moving the second portion 134 into contact with the first portion 132 brings the contact surface 148 into contact with the insert 126 compressing the insert 126 into the groove causing the insert 126 to deform inwards towards the longitudinal centre line of the bore 122. This forces the insert 126 tightly into each wire 18 tightening the seal around each wire 18.

The removable and reengagable connection means comprise four threaded bores 162 in the first end 140 of the first portion 132, and four bores 164 that extend through the second portion 134 and are aligned with the threaded bores 162 in the first portion 132. Four threaded fastener 166 are provided in each of the threaded bores 162 and are arranged such that they extend through the second portion 134 engaging within the first portion 132. Turning the threaded fasteners 166 in a first direction moves the second portion 134 towards the first portion 132 compressing the inserts 126 and improving the seal around the wires 18. Turning the threaded fasteners 166 in a second direction moves the second portion 134 away from the first portion 132 de-compressing the inserts 126 and decreasing the seal around the wires 18. The threaded fasteners 166 also help to align the second portion 134 on the first portion 132 in the desired orientation.

In another alternative embodiment the high pressure seal 10 is similar to that described above except where described below. The high pressure seal 10 does not have the cylindrical connection member 156 arranged at the first end 128 of the second portion 134. The removable and reengagable connection means comprise a single threaded bore 170 in the first end 140 of the first portion 132, a bore 172 extending through the second portion 134 aligned with the threaded bore 170, and a threaded fastener 174 extending through the bore 172 in the second portion 134 and engaging within the threaded bore 170 in the first portion 132. Turning the threaded fastener 174 in a first direction moves the second portion 134 towards the first portion 132, and turning the threaded fastener 174 in a second direction moves the second portion 134 away from the first portion 132.

The fitting 120 may also include one or more alignment means. The alignment means each have a bore 176 extending throughout second portion 134 into the first end 140 of the first portion 132. An alignment member is arranged to engage within the bore 176 and extend from the first end 128 of the second portion 134 through the second portion 134 engaging within the first portion 132. The alignment member or members help keep the second portion 134 aligned in the desired orientation on the first portion 132.

In an alternative embodiment the high pressure seal may include any appropriate number of bores 24 or 122 to accommodate a corresponding number of wires 18.

In an alternative embodiment the high pressure seal may include any appropriate number of threaded fasteners or alignment members.

While one embodiment of the present invention has been described in the foregoing, it is to be understood that other embodiments are possible within the scope of the invention. The invention is to be considered limited solely by the scope of the appended claims.

We claim:

1. An apparatus for treating water from a water supply comprising
   a electric device submersible in the water and having a plurality of separate electrical wires extending therefrom for communication of electrical power thereto;
   a housing closed housing for receiving the water and for surrounding the electric device, said housing having an outer wall and a threaded cylindrical opening through the outer wall;
   a fitting for engaging within the opening in the housing closing the opening, said fitting comprising a fitting body having a first end arranged external to the housing, a threaded end arranged to removably and reengagably fasten within the threaded opening in the housing;
   a single bore extending through the fitting body from the first end to the threaded end thereof, said bore having an interior surface surrounding a longitudinal axis of the fitting body arranged to receive said plurality of wires therethrough;
   a resilient sealing plug arranged within the bore, the plug having an outer plug surface for engaging the interior surface of the bore and a plurality of plug bores extending therethrough generally parallel to each other and to the longitudinal axis each for receiving a respective one of the wires passing therethrough;
   and an end cap for engaging onto the fitting body at the first end for compressing the plug in an axial direction;
   the outer plug surface having a frusto conical portion surrounding the axis co-operating with a similar frusto conical portion of the interior surface such that the compression of the plug in an axial direction causes compression of the frusto conical portion in a direction radial to the axis;
   each of the plug bores having a first raised annular protrusion of the plug projecting inwardly into the bore for engaging the respective wire for applying a sealing pressure thereto;
   the outer plug surface having a first raised annular protrusion of the plug projecting outwardly relative to the frusto conical surface toward the interior surface of the fitting body, the first annular protrusion of the outer plug surface being axially aligned with the first annular protrusions of the bores.

2. The apparatus according to claim 1 wherein each bore has a second annular protrusion projecting inwardly into the bore for engaging the respective wire for applying a sealing pressure thereto axially spaced from the said first annular protrusions of the bores and wherein the outer plug surface has a second raised annular protrusion of the plug projecting outwardly relative to the frusto conical surface toward the interior surface of the fitting body, the second annular protrusion of the outer plug surface being axially aligned with the second annular protrusions of the bores.

3. The apparatus according to claim 2 wherein the first and second annular protrusions on the outer surface are arranged at respective ends of the frusto conical portion.

4. An apparatus for treating water from a water supply comprising:
   a electric device submersible in the water and having a plurality of separate electrical wires extending therefrom for communication of electrical power thereto;
   a closed housing for receiving the water and for surrounding the electric device, said housing having an outer wall and a threaded cylindrical opening through the outer wall;
   a fitting for engaging within the opening in the housing closing the opening, said fitting comprising a fitting body having a first end arranged external to the housing, a threaded end arranged to removably and reengageably fasten within the threaded opening in the housing;
   a plurality of bores extending through the fitting body from the first end to the threaded end thereof, each said bore having a cylindrical interior surface arranged to receive a respective one of said plurality of wires therethrough, the bores being generally parallel and extending longitudinally through the fitting body;
   the fitting body comprising two parts divided transversely to the longitudinal direction to form an inner part including said threaded end and an outer part including said first end;

the inner and outer parts meeting at two mating surfaces and each having a part of each of the bores defined therein such that each of the bores breaks out onto the mating surface of each of the inner and outer parts;

the mating surfaces at each bore lying in a common plane at right angles to the axis of the bore;

a plurality of screw fasteners clamping the outer part onto the inner part at the mating surfaces;

each bore including a recess formed in one of the mating surfaces and surrounding the cylindrical inner surface of the bore so as to face the other of the mating surfaces;

each bore having an O-ring received within the respective recess and arranged such that the O-ring in the recess is squeezed into the recess by the other of the mating surfaces so as to seal around the wire passing through the bore.

5. The apparatus according to claim 4 wherein each bore has a recess formed in one only of the mating surfaces and the other of the mating surfaces is flat in the common plane thereof.

6. The apparatus according to claim 4 wherein the recess of each bore has a side surface which tapers inwardly along the bore.

7. The apparatus according to claim 4 wherein there is provided at least one alignment member for aligning the inner and outer parts, the alignment member comprising a bore extending into each of the inner and outer parts and a pin located in the bore.

* * * * *